United States Patent [19]

Phillips

[11] 4,399,546
[45] Aug. 16, 1983

[54] SILICON CARBIDE FURNACE

[75] Inventor: James D. Phillips, Lewiston, N.Y.

[73] Assignee: Dresser Industries, Inc., Dallas, Tex.

[21] Appl. No.: 283,696

[22] Filed: Jul. 15, 1981

Related U.S. Application Data

[63] Continuation-in-part of Ser. No. 79,763, Sep. 28, 1979, abandoned.

[51] Int. Cl.³ .......................... H05B 3/36; F27D 3/06
[52] U.S. Cl. ..................................... 373/115; 373/120
[58] Field of Search ....................... 373/8, 79, 115, 116, 373/120; 414/147, 154, 155, 157, 160; 266/176

[56] References Cited

U.S. PATENT DOCUMENTS 492,767  2/1893  Acheson .
560,291  5/1896  Acheson .
965,142  7/1910  Tone .................................. 373/115
3,976,829  8/1976  Wiebke et al. ...................... 373/120
4,158,744  6/1979  Petersen .

FOREIGN PATENT DOCUMENTS 409356  2/1925  Fed. Rep. of Germany .
2316494  10/1974  Fed. Rep. of Germany ...... 373/120

Primary Examiner—Roy N. Envall, Jr.
Attorney, Agent, or Firm—Barry E. Deutsch; Raymond T. Majesko

[57] ABSTRACT

Electrical resistance furnace and manufacturing plant for the preparation of silicon carbide utilizing a resistance core of carbon horizontally inserted within the load and having a broken ring configuration.

10 Claims, 3 Drawing Figures

SILICON CARBIDE FURNACE

BACKGROUND OF THE INVENTION

This application is a continuation-in-part of patent application Ser. No. 79,763 filed Sept. 28, 1979, now abandoned.

Silicon carbide may be formed under various time-temperature conditions from mixtures of carbon and silica or silicon. It can be formed as low as 525° C. from silicon and carbon under special conditions from a carbon enriched alloy of silicon, aluminum and zinc. Silicon carbide crystals have also been produced by gaseous cracking in at least five vapor systems. It is produced primarily in batch type furnaces ranging up to 60 ft. long by 10 ft. wide and holding up to about 200,000 lbs. of sand-coke mix. The furnace walls commonly consist of removable sections of cast iron frames lined with low grade firebrick. The conventional or "Acheson" furnace has essentially remained unchanged for the past seventy years.

The mix is delivered to the furnace by a hopper and an overhead traveling crane or by conveyors. When the furnace is approximately ½ full, the loading is interrupted temporarily so that a loose graphite core can be placed between the electrodes located at each end of the furnace. The core is of uniform cross-section and may be about 10 inches thick and 16 inches wide, depending upon the size of the furnace. Placing the balance of the mix above the core completes the loading operation. The conventional furnace requires approximately four men to load the mix at a rate of approximately 40 to 45 tons per hour. The foregoing provides a productivity ratio of approximately 10 to 11 tons per man-hour.

Power is applied at rates up to about 5,000 kw and at voltages ranging from approximately 500 to 200 as the resistance of the charge changes during the heating period of about 1½ days. The heated charge requires several days cooling to permit handling. Upon removing the sidewalls, the loose covering falls away exposing the ingot. The covering is similar in composition to the original mix and is reused. The ingot is oval in cross-section and is encased in a crust of about 1–2 inches thick. This relatively thin crust forms because the temperature gradient at that position favors condensation of the oxide impurities. This concentration facilitates the effective disposal of the unwanted impurities.

The ingot proper, containing the commercial crystals of silicon carbide, is broken into large sections and removed from the furnace. The graphite core is recovered for reuse as a core material. The crystalline ingot is finally crushed and is screened to desired sizes. Depending upon end use, the grain may be further treated by cleaning with acid or alkali, then washed with water and dried. The above-described process is well known as the "Acheson" process.

Such furnace installations usually require four to six furnaces for each transformer in order to utilize the transformer to its maximum efficiency, with one furnace heating, one being unloaded, one loading, and the remainder cooling. This requires very large capital investment in buildings and furnaces. The unloading of such furnaces is quite difficult and tedious because of the adjacent hot furnaces and because of the necessity of using large amounts of hand labor to remove the silicon carbide from the furnace due to the proximity of the adjacent furnaces and the difficulty of using mechanical unloading equipment in the restricted floor space available. This also requires that the furnaces be cooled an extraordinarily long time before unloading in order to get the temperature down to the point where the hand labor can be effectively used. A further problem arises in the loading of such furnaces because of the adjacent other furnaces. This means lengthy conveyor belts from the mixing bins to the furnaces or overhead cranes carrying successive bucket loads to the furnace. The entire process takes between 6 to 7 days from start to finish. A conventional plant, with six furnaces per transformer and six transformers requires 40 to 50 men for operation on a continuous shift basis.

The furnace of the present invention is designed to significantly reduce the operating costs of the process by optimizing power usage and increasing the loading productivity ratio to approximately 100 to 110 tons per man-hour. The ten-fold loading productivity ratio increase (1000%) can be directly attributed to the design of the furnace disclosed herein which accommodates automated material handling apparatus for loading of the mix into the furnace. Further, the novel design permits utilization of large machinery, such as front-end loaders or the like, for unloading the furnace.

SUMMARY OF THE INVENTION

Accordingly, it is among the objects of this invention to provide an improved furnace design utilizing Acheson principles.

Another object of the invention is to provide an improved silicon carbide manufacturing plant.

Still another object is to reduce operating costs of a silicon carbide furnace by increasing the productivity ratio and optimizing power usage.

A further object is to attain effective pollution control in a silicon carbide plant.

Still a further object is to reduce electrical losses.

Yet another object is to reduce the hazards attendant the operation of such furnaces.

Yet a further object is to improve material handling.

In accordance with the present invention, there is provided an electrical resistance furnace operated by direct electric heating for the preparation of silicon carbide from a load of silicious and carbonaceous materials. The current is supplied by means of bus bars and electrodes through a resistance core of carbon horizontally inserted within the load. The core and the load are of broken ring configuration.

The electrical resistance furnace is situated in a heating enclosure only of a size sufficient to accommodate the operation. There is a means for loading and unloading the furnace. The entire top of the enclosure is sealed except for ductwork which leads to a dust collector.

DESCRIPTION OF THE PREFERRED EMBODIMENT

Figure 2:
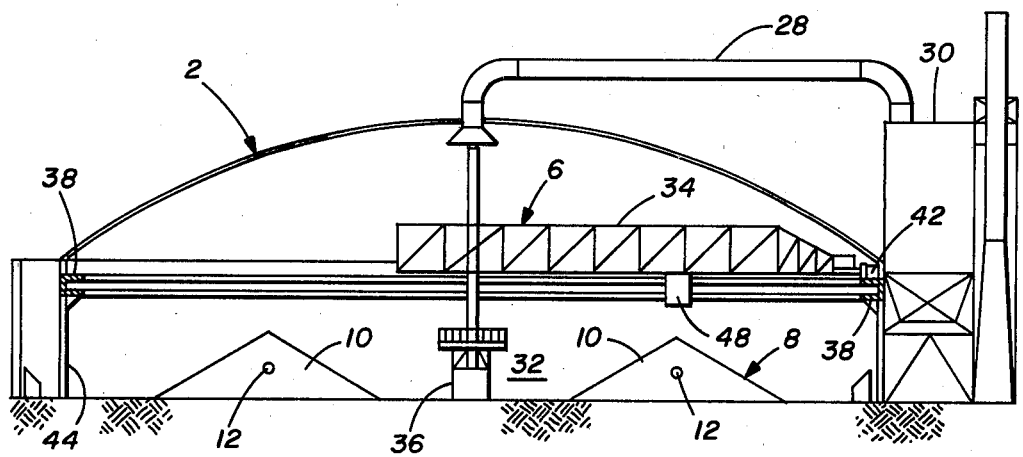
FIG. 2 is an elevation view of a portion of the plant illustrated in FIG. 1.
Figure 1:
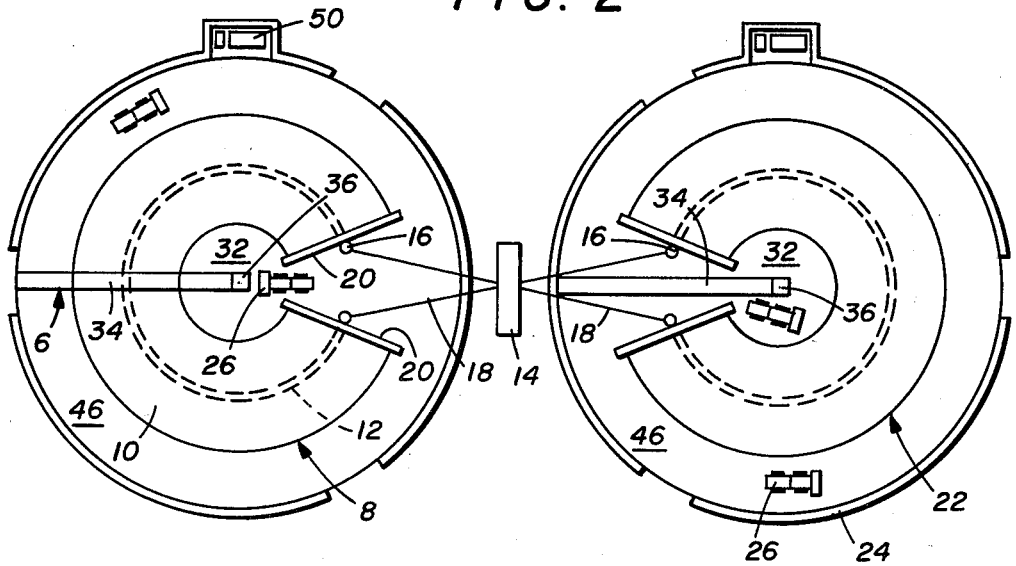
FIG. 1 is a plan view of the improved silicon carbide manufacturing plant.

Referring to FIGS. 1 and 2, there is shown a furnace installation situated within a heating enclosure or building 2. As illustrated, the building is preferably dome-shaped and may be constructed as a geodesic dome. A conveyor (not shown) brings the raw materials, silicious and carbonaceous, already properly mixed, from a main building to the enclosure. This conveyor discharges onto a cross conveyor (not shown) which empties onto material handling device 6, to be more fully described hereinafter, located above the broken-ring furnace to be formed. This device loads furnace 8 with the proper charge of raw materials 10. It also places graphite core 12 in its desired location with respect to the charge of materials. The furnace design is an angle of repose furnace, preferably, and does not employ any sidewalls or gates to contain the furnace charge. However, sidewalls may be employed if desired.

Further, furnace 8 is shaped in a broken ring configuration to define a central working space 32. Material handling device 6 includes a rotatable stacking member 34. One end of member 34 is rotatably supported upon pedestal 36 located at the center of working space 32. The other end of member 34 has a wheel 42 or similar device attached thereto. The wheel is supported upon track 38 circumferentially connected to the inner surface of sidewall 44 of building 2. Stacking member 34 includes a discharge chute 48 or similar device alignable with core 12. As stacking member 34 rotates about its centrally located support pedestal 36, the raw materials fall via chute 48 in a generally ring-like pattern. However, a sector of the ring is left open (hence the broken ring configuration for furnace 8) for permitting ready access to working space 32.

In loading the furnace, the bottom portion is first formed and then stopped. Next core 12 is laid on the mixture. Then the furnace is topped off in a triangular-like configuration.

Once this is accomplished, an electrical power source, such as transformer 14, is electrically connected to electrodes 16 located at either end of the furnace via bus bars 18. Because the furnace is almost a complete ring, and the transformer is located near the two endwalls 20 of the furnace, very short bus work runs are needed to make this connection. The transformer may serve the furnace shown and an adjacent furnace or furnaces 22 located in another heating enclosure 24, to start operations when the first furnace is being cooled. The power applied through the bus bars, electrodes and through the core, may be either AC or DC. The power is sufficient to provide a temperature to react the silicious and carbonaceous material to form silicon carbide.

Once the heating cycle is complete, transformer 14 is disconnected and the cooling-unloading procedure begins. The furnace is cooled and unloaded in stages. Initially, the furnace pile is allowed to cool, undisturbed, for several days. At this time, a mobile shovel such as front-end loader 26 or other equipment is brought into the enclosure. This equipment begins to unload the furnace by stripping the overburden pile in stages. Since the furnace has a broken ring configuration, the mobile shovel can be brought into working space 32 through the opening formed between endwalls 20. Shovel 26 may be used to mechanically strip the overburden. In conventional silicon carbide furnace designs, the unloading as well as most of the loading processes must be accomplished through costly and time-consuming methods. The stripping operation is done so that the hotter material below the surface of the pile is continuously exposed to air. Once the furnace overburden pile is removed and the silicon carbide ingot is exposed, it is allowed to cool for several days. The cooling of the ingot may be aided by a water spray. After the cooling period, the ingot is removed from the furnace by the same unloading equipment and taken to a central cleaning and sorting area. Once the ingot is removed from the furnace the loading cycle may be repeated.

Pollutants formed during the loading, heating and stripping steps pass through duct 28 and are collected and processed in auxiliary equipment 30 forming a pollutant processing station. The discharge from equipment 30 meets government emission standards. Historically, pollutant emissions from silicon carbide furnacing plants have been a major problem for the industry. This is the only plant as presently known by the inventor which effectively deals with the pollution problem during all phases of the furnace operation. As the walls of dome 2 are impermeable, all of the pollutants formed during the process are entrapped within the building and prevented from escaping to the atmosphere.

It should be noted since the walls of building 2 are generally circular as is the shape of furnace 8, a second working space 46 is formed therebetween. As illustrated in FIG. 1, shovel 26 can move through the second working space for delivering the overburden to a screening system 50 for subsequent recycling into the raw material staging area.

The above described plant reduces operating costs in manufacturing silicon carbide. Less manpower is required. The shorter bus bars reduce cost of material and reduce electrical loss. Pollution control is readily achieved. The furnace is more easily loaded and unloaded. Hazard to workers is materially reduced since they need not be in the plant heating enclosure when the furnace is in operation.

Figure 3:
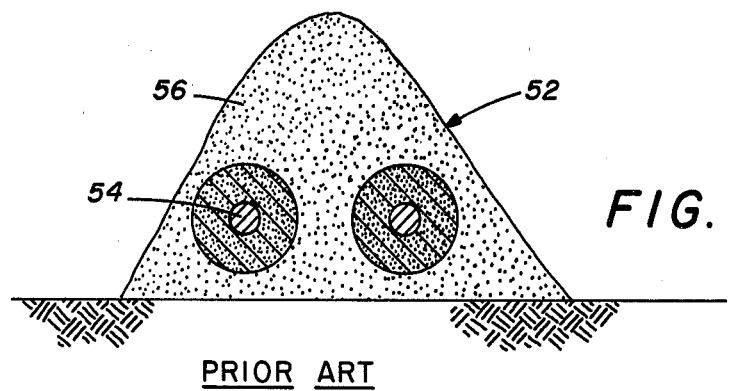
FIG. 3 is a sectional view of a prior art furnace.

Referring to FIG. 3, there is illustrated a sectional view of a relatively new silicon carbide furnace which has attempted to solve some of the inherent disadvantages associated with the conventional Acheson furnace. This prior art furnace 52 is disclosed in U.S. Pat. No. 4,158,744 and comprises a generally U-shaped resistance core 54, entirely surrounded by raw material 56 (reactive overburden). The furnace of the present invention, due to its generally ring-like configuration, may be loaded by an automated material handling device such as stacking member 34. In effect, the configuration of the furnace herein disclosed enables a relatively simple, single point rotating device to be employed in loading the furnace. The simple, single point rotating device cannot be advantageously employed with the prior art U-shaped furnace having two straight parallel legs joined by a semi-circular connecting portion. Further, in the prior art furnace, electrical insulating materials must be placed between the electrodes to prevent current leakage between the parallel straight legs. Such insulating materials can contaminate the raw materials forming the reactive overburden. The insulating materials are required since the burden is placed between the two legs thus providing an electrical flow path therebetween. The arrangement of the present invention does not require the use of insulating material between adjacent electrodes 16 since the graphite core and its overlying reactive burden diverge from the electrodes. The air in working space 32 acts as a natural insulator to prevent undesired current leakage.

As may readily be observed with reference to FIGS. 1 and 2, the furnace of the present invention permits the electrodes to be placed relatively close to each other to minimize bus bar lengths to reduce electrical losses. The design also enables relatively simple material handling devices to be used for loading and unloading the furnace to substantially increase the loading productivity ratio, i.e. as noted previously a 1000% increase in the loading productivity ratio is obtained.

Merely by way of example, a small furnace of about 30 inches in diameter was built on a flat bed of refractory brick. A layer of sand, coke and recycled mix was then spread about 6 inches wide and 2 inches deep on the 30-inch circle. On the axis of the bed, a 1 inch by 1¼ inch graphite core was laid, each end being connected to a 2 inch graphite rod which, in turn, was connected to a 50 KVA transformer. Six inches of mix were then added over the core, thus forming a triangular cross-section of mix on a 30 inch diameter ring. After heating and cooling, a silicon carbide ingot of broken ring configuration having a uniform cross-section was recovered.

It is intended that the foregoing description and drawings be construed as illustrative and not in limitation of the invention.

The embodiments of the invention in which an exclusive property or privilege is claimed are defined as follows:

1. A silicon carbide manufacturing plant comprising:
    an electrical power source;
    a furnace enclosure;
    an electrical resistance furnace disposed within the enclosure and operated by electric heating for the preparation of silicon carbide from a load of silicious and carbonaceous material;
    the current being supplied by means of electrodes through a resistance core of carbon horizontally inserted within a load, said core and load being of broken ring configuration to define a centrally located circular working space;
    means for loading the furnace in said broken ring configuration including a material handling device supported for rotation at the center of said working space for placing said load about said core; and
    means for unloading the furnace.

2. The plant of claim 1 in which the cross-sectional configuration of the furnace is triangular.

3. The plant of claim 1 wherein the walls of said furnace enclosure are of ring-like configuration and spaced from said furnace for defining a second circular working space concentric to and spaced radially outward from said centrally located working space.

4. The plant of claim 1 in which said load is free-standing and unrestrained.

5. In an electrical resistance furnace operated by electric heating for the preparation of silicon carbide from a free-standing load of silicious and carbonaceous material, the current being supplied by means of electrodes through a resistance core of carbon horizontally inserted within the load, the improvement comprising said core and load being of broken ring configuration for defining a centrally located working space; a material handling device supported for rotation at the center of said working space for placing said load about said core; and said load is free-standing and unrestrained.

6. The furnace of claim 5 in which the cross-sectional configuration is triangular.

7. A silicon carbide maufacturing plant comprising:
    a dome defining a non-combustible enclosure and having track means circumferentially connected to the inside surface of the side walls of the dome;
    an electrical power source;
    a free-standing pile of silicious and carbonaceous material located within the enclosure and being shaped in a broken ring configuration to define a centrally located circular working space;
    a source of electrical power including a pair of spaced electrodes;
    a resistance core shaped in a broken ring configuration to provide spaced end points and being horizontally inserted within the pile of material, with one of said electrodes being connected to one of said end points and the other of said electrodes being connected to the other of said end points, with electrical current being supplied from said electrical power source through said electrodes to said resistance core to heat said material; and
    material handling means for loading said pile of material in said broken ring-like configuration including support means located at the center of said working space and a stacking device having one end rotatably mounted on said support means and including a discharge member for discharging said material as said device is rotated to form said broken ring pile, the other end of said stacking device being supported by said track means for relative movement between said device and said dome.

8. A plant in accordance with claim 7 wherein said dome prevents all pollutants generated during the loading, heating, and unloading of said material from escaping to the atmosphere; and said plant further includes means disposed within said dome for collecting said pollutants and transferring same to a processing station remote from said dome.

9. A plant in accordance with claims 7 or 8 wherein said dome is a geodesic dome.

10. A plant in accordance with claim 7 wherein the walls of said dome are spaced from said free-standing pile for defining a second circular working space concentric to and spaced radially outward from said centrally located working space.

* * * * *